(12) United States Patent
Billington

(10) Patent No.: US 6,314,338 B1
(45) Date of Patent: Nov. 6, 2001

(54) AUTOMATIC CONFIGURATION OPTIONS FOR MULTI-ELEMENT ROBOTIC LIBRARY CONFIGURATIONS

(75) Inventor: Robert L. Billington, Lyons, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/477,682

(22) Filed: Jan. 6, 2000

(51) Int. Cl.$^7$ .................................................. G05B 19/00

(52) U.S. Cl. .................... 700/245; 700/215; 700/260; 701/23; 701/50; 369/36; 369/178; 360/92; 901/1; 901/6

(58) Field of Search ................................. 700/245, 215, 700/260; 701/23, 50; 360/92; 901/1, 6; 369/178, 36; 414/277, 744.3; 707/204; 710/28; 711/111, 112, 136, 153, 160, 173

(56) References Cited

U.S. PATENT DOCUMENTS

| | | | | |
|---|---|---|---|---|
| 5,506,986 | * | 4/1996 | Healy ..................................... | 707/204 |
| 5,546,366 | * | 8/1996 | Dang ....................................... | 369/36 |
| 6,175,466 | * | 1/2001 | Hori et al. ............................. | 360/92 |

OTHER PUBLICATIONS

Beccari et al., A real–time library for the design of hybrid robot control architectures, 1998, IEEE, pp. 1145–1150.*
Kendall, Cimarron user experience, 1988, IEEE, pp. 93–97.*

* cited by examiner

Primary Examiner—Tan Nguyen
Assistant Examiner—McDieunel Marc
(74) Attorney, Agent, or Firm—Brooks & Kushman P.C.

(57) ABSTRACT

A robotic library system having a self-discoverable inter-library connectivity capability, and methods of operating the robotic library system are provided. Each library of the multi-library system has a unique identifier with which it is associated. The identifiers are adapted to be readable by identifier readers in adjoining libraries connected by pass through ports. In operation, knowledge of the library identity on each side of the pass through ports can be used to control transfers of the data cartridges among the libraries. Data cartridge transfers between connected libraries may be initiated when just the source library and pass through port are ready, then completed when the destination library becomes ready. Transfer paths spanning several libraries may be discovered by querying adjoining libraries for their identity until all possible paths are discovered. In an alternative method, the data cartridge and the identity of the destination library may be transferred from library to library in a random or predetermined order until the data cartridge reaches the destination library.

21 Claims, 8 Drawing Sheets

AUTOMATIC CONFIGURATION OPTIONS FOR MULTI-ELEMENT ROBOTIC LIBRARY CONFIGURATIONS

TECHNICAL FIELD

The present invention is related to the field of automatic configuration detection and methods of operation for robotic data library systems

BACKGROUND ART

Very large robotic library systems are formed by linking two or more stand-alone libraries together. Each stand-alone library consists of a library storage module having hundreds to thousands of cells for storing data cartridges, one or more read/write cartridge drives, one or more robotic arms for moving the data cartridges between the cells and read/write cartridge drives, and one or more library controllers. Inter-library data cartridge transfers are accomplished by a device called a pass through port. Each pass through port has the ability to move one or more data cartridges at a time between the two library that it couples together. Coordination of data cartridge movement through a pass through port is usually accomplished in a master/slave relationship. One library controls the pass through port as a master, the other library operates as a slave.

In very large robotic library systems, each library is often coupled to several of its neighbor libraries by the pass through ports. This is done to provide multiple paths entering and exiting each library. This also results in multiple paths between any two given libraries in the robotic library system. Should one path fail or become busy with other tasks, a data cartridge can be transferred between libraries by an alternative path.

Coordination of inter-library data cartridge transfers is accomplished by one or more library management units. Each library management unit is aware of the configuration of the robotic library system, and has the ability to communicate with all, or at least some of the libraries. The library management unit is thus given the responsibility of instructing individual libraries when and where to move a given data cartridge in order to move that data cartridge from a source library to a destination library.

Problems can arise when the library management units have the wrong information about the configuration of the robotic library system. Incorrect information is currently introduced at installation and expansion times. Installers manually enter configuration data into the library management unit since the hardware lacks a capability for self-discovery. Existing installations have included as many as sixteen libraries interconnected by up to twenty-nine pass through ports. Manual configuration entry becomes even more prone to manually induced error when the robotic library system has multiple library management units. The installers must enter the exact same information into all of the library management units to insure proper operations.

Another source of manually induced error comes from the clients who use the very large robotic library systems. Client generated code that is dependent upon the robotic library system configuration must have the exact same information that the installer entered into the library management units. Any mismatch between the client generated code and the library management unit concerning the configuration can result in unwanted and unexpected operations.

DISCLOSURE OF INVENTION

The present invention is a robotic library system, and methods of operation for automatic configuration discovery and subsequent movements of data cartridges within the system. The robotic library system has multiple libraries connected by one or more pass through ports. Each library is capable of storing a plurality of data cartridges. Each pass through port is capable of moving one or more data cartridges at a time between the two libraries that it connects together. Unique identifiers are associated with each library and are adapted to be readable by identifier readers disposed in adjoining libraries coupled by the pass through ports.

The identifiers may be in the form of memory devices, optical patterns, or the like. Memory device type identifiers may be disposed within the associated library and transferred to the adjoining libraries through communications channels. The communications channels may be functionally and/or physically routed through the pass through ports. Alternatively, the memory device type identifiers may be disposed within the adjoining library by the installer at installation time. Likewise, optical pattern based identifiers of one library may be mounted in the adjoining libraries, preferably near the appropriate pass through port.

In operation, the identifier readers of one library read the identifiers of each adjoining library connected by a pass through port. This information is then combined in a library management unit to produce an inter-library connectivity model for the robotic library system. The library management unit may use this model to select an appropriate path through one or more pass through ports and libraries to move a data cartridge from a sending library to a destination library.

Knowledge of the identity of interconnected libraries allows interlibrary paths to be determined by the libraries themselves, instead of by the library management unit. The sending library may query its adjoining libraries through the communication channels in search of the destination library. If the source and destination libraries are not directly connected by a pass through port, then those libraries adjoining the source library query their adjoining libraries, and so on, until the destination library is queried. The destination library responds to each query received with an answer. News of all paths found is relayed back to the source library where one path is selected. Finally, the data cartridge is sent on its way to the destination library through the selected path.

In another method of operation, the source library queries its adjoining libraries seeking the destination library. If the destination library is not directly connected to the source library, then the source library may move a data storage cartridge to one of its adjoining libraries along with the destination library's identity. The libraries receiving the data cartridge will then repeat the process, moving the data cartridge to other adjoining libraries, until the data cartridge reaches the destination library.

Intelligence in the pass through port allows data cartridge movements between connected libraries to take place with the libraries acting as peers to each other. Here, the source library will request a pass through port to position itself to receive a data cartridge with the source library. Once the pass through port indicates that it is positioned, the source library moves the data cartridge into the pass through port. After the source library has informed the pass through port that it is finished loading the data cartridge, the pass through port repositions the data cartridge to give it to the destination library. When ready to unload the data cartridge, the pass through port notifies the destination library that the data cartridge is available. The destination library then unloads the data cartridge from the pass through port.

Accordingly, it is an object of the present invention to provide a robotic library system having multiple libraries wherein each library has a unique identifier and an identifier reader mechanism capable of reading the identifiers associated with adjoining libraries connected through a pass through port. The identifiers and identifier readers provide the robotic library system with a configuration self-discovery capability.

Another object of the present invention is a method of operating a robotic library system where the individual libraries use the self-discovered configuration information and inter-library communications to move data cartridges between libraries.

These and other objects, features and advantages will be readily apparent upon consideration of the following detailed description in conjunction with the accompanying drawings.

BEST MODE FOR CARRYING OUT THE INVENTION

Figure 1:
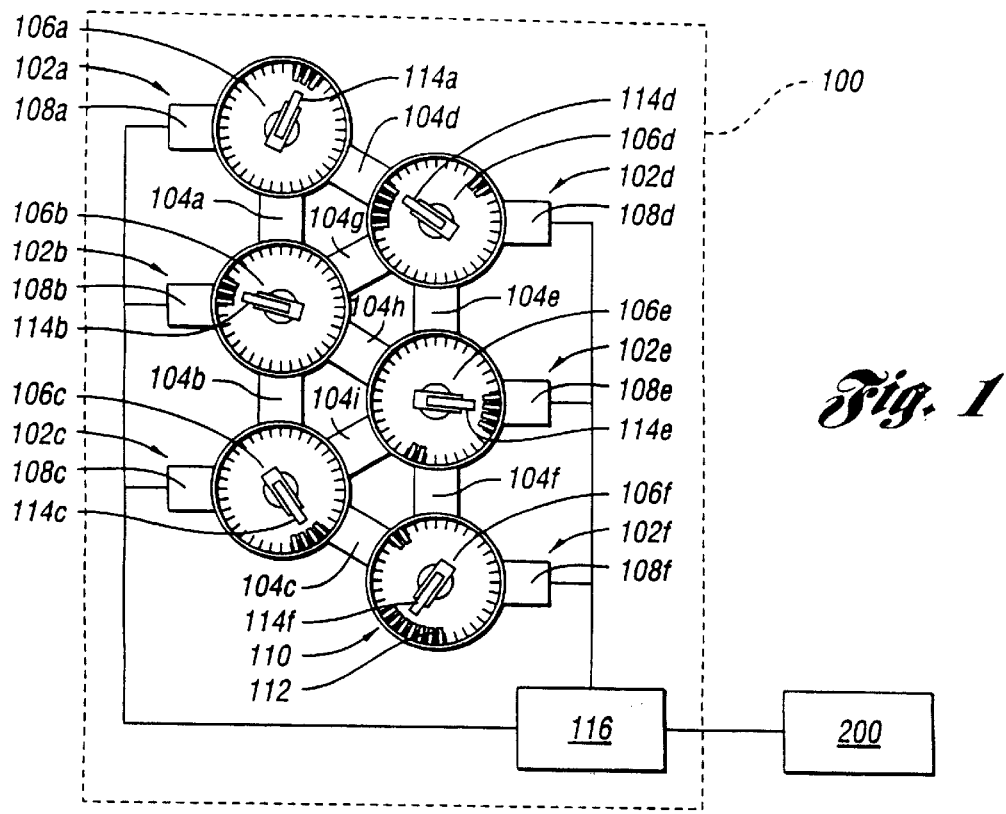
FIG. 1 is a schematic diagram of a robotic library system that implements the present invention.

FIG. 1 is a schematic diagram of a robotic library system 100 implementing the present invention. The robotic library system 100 consists of multiple libraries 102*a–f* interconnected by multiple pass through ports 104*a–i*. Each library 102*a–f* includes a library storage modules (LSM) 106*a–f* and a library control unit (LCU) 108*a–f* respectively. Inside each LSM 106*a–f* are multiple storage cells 110 for storing data cartridges 112, and a robotic mechanism 114*a–f* for moving the data cartridges about inside the LSMs 106*a–f*. The pass through ports 104*a–i* are attached to the LSMs 106*a–f* to enable adjoining libraries 102*a–f* to exchange data cartridges. Each LSM 106*a–f* is typically, although not necessarily, interconnected with between two to four adjacent LSMs 106*a–f* through the pass through ports 104*a–i*.

Control of the robotic mechanisms 114*a–f* is provided by the LCUs 108*a–f* respectively. The LCUs 108*a–f* instruct the robotic mechanisms 114*a–f* when and how to insert and remove data cartridges from the storage cells 110, and insert and remove the data cartridges from the pass through ports 104*a–i*. To coordinate the overall activities of the robotic library system 100, each LCU 108*a–f* is in communication with a library management unit (LMU) 116. The LSU 116 provides a uniform interface to a client 200 making all six libraries 102*a–f* appear as one larger library from the client's 200 point of view.

Figure 2:
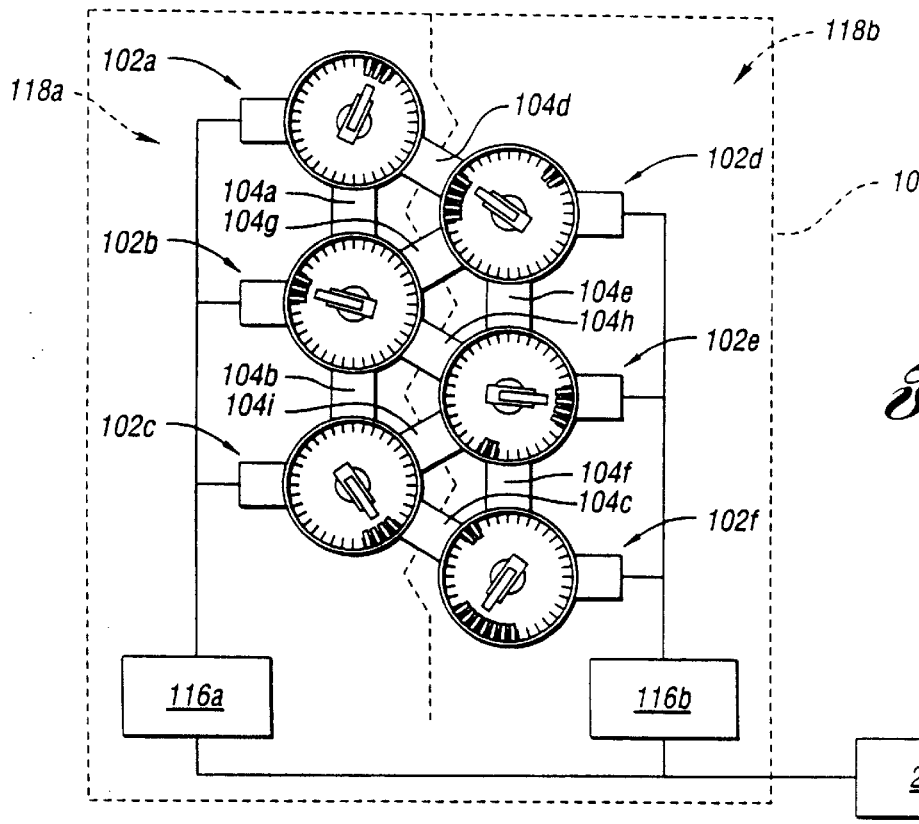
FIG. 2 is a schematic diagram of a robotic library system having multiple library management units.

FIG. 2 is a schematic diagram of an alternative embodiment of the robotic library system 100. In this embodiment, the robotic library system 100 appears to the client 200 as two logical robotic library systems 118*a* and 118*b*. One logical robotic library system 118*a* consists of three libraries 102*a–c*, that are in communication with a first LMU 116*a*. The second logical robotic library system 118*b* consists of the other three libraries 120*d–f*, in communication with a second LMU 116*b*. Pass through ports 104*a–i* interconnecting the various libraries 102*a–f* allowing the two logical robotic library systems 118*a* and 118*b* to exchange data cartridges.

In order to pass a data cartridge between libraries 102*a–f*, for example from library 102*a* to library 102*f*, the inter-library connectivity of the robotic library system 100 must be known. Traditionally, it has been the responsibility of either the installer or the client to manually enter this connectivity information into the LMUs 116*a–b*. The present invention provides for automatic self-discovery of the inter-library library connectivity. Self-discovery may be performed automatically upon power up, it may be performed periodically, it may be initiated manually, and it may be performed as required to move the data cartridges between libraries.

Figure 3:
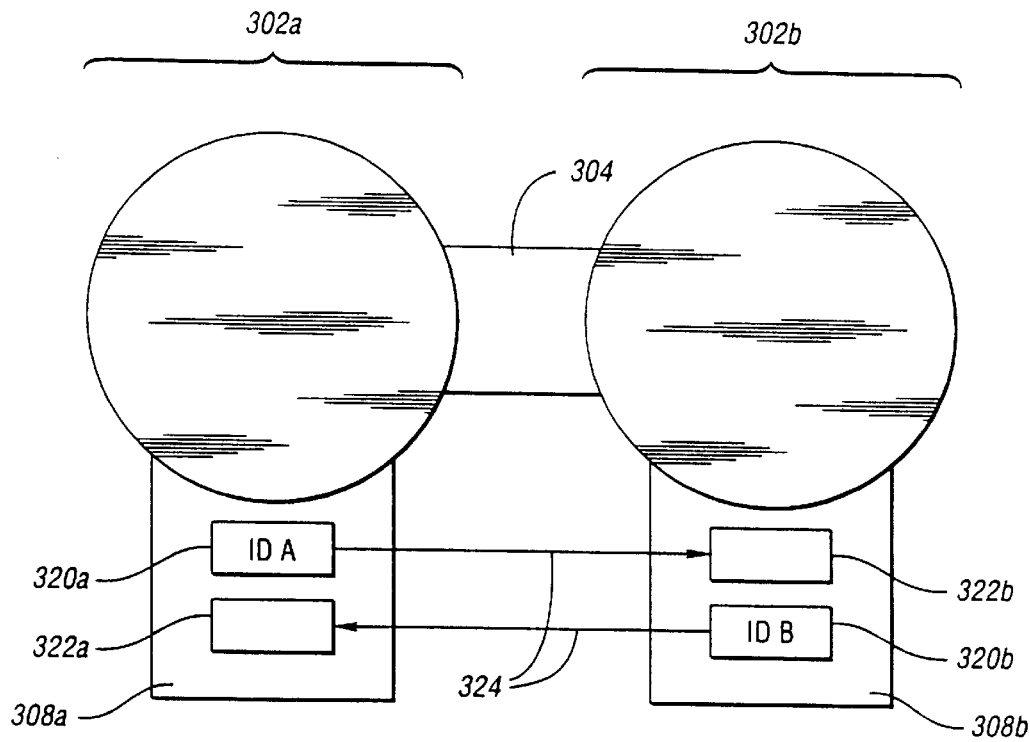
FIG. 3 is a schematic diagram showing the identifiers in communication with identifier readers in adjoining libraries.

Referring to FIG. 3, self-discovery is accomplished by providing each library 302*a–b* with a unique identifier 320*a–b* (ID A and ID B). These identifiers 320*a–b* are adapted to be readable by identifier readers 322*a–b* associated with adjoining libraries 302*a–b* connected by the pass through port 304. In the example shown in FIG. 3, the identifier A 320*a* mounted inside the left LCU 308*a* of the left library 302*a* is readable by the right identifier reader 322*b* mounted inside the right LCU 308*b* of the right library 302*b*. Likewise, the identifier B 320*b* mounted inside the right LCU 308*b* of the right library 302*b* is readable by the left identifier reader 322*a* mounted inside the left LCU 308*a* of the left library 302*a*. As read, the identifiers 320*a–b* may appear as numbers, characters, symbols, combinations of numbers, characters and/or symbols, and the like. Physically, the identifiers 320*a–b* may be in the form of an optical media, electrical media, or other suitable media.

Consider an example where the identifiers 320*a–b* and the identifier readers 322*a–b* are implemented electronically. Here, the identifiers 320*a–b* may be PROMs containing unique binary numbers for each library 302*a–b* respectively. Identifier readers 322*a–b* are microprocessors capable of reading the binary information stored in the PROMS 320*a–b*. The identifiers 320*a–b* are adapted to be readable by the identifier readers 322*a–b* by electrically linking the PROMs 320*a–b* to the microprocessors 322*a–b* using a communication channel 324 made of discrete wires.

In another example, the identifiers 322*a–b* may be in the form of optical light sources that repeatedly blink a unique pattern for each library 302*a–b*. Identifier readers 322*a–b* are light sensors sensitive to the light emitted by the light sources 320*a–b*. Communication channel 324 is a pair of fiber optical cables, where each fiber optical cable is coupled to a light source 320a–b at on end and the corresponding light sensor 322a–b at the other end. Many other forms of identifiers 320a–b, identifier readers 322a–b, and communication channels 324 are possible within the scope of the present invention. The examples listed are provided as illustrations, and are not meant to be limitations.

Figure 4:
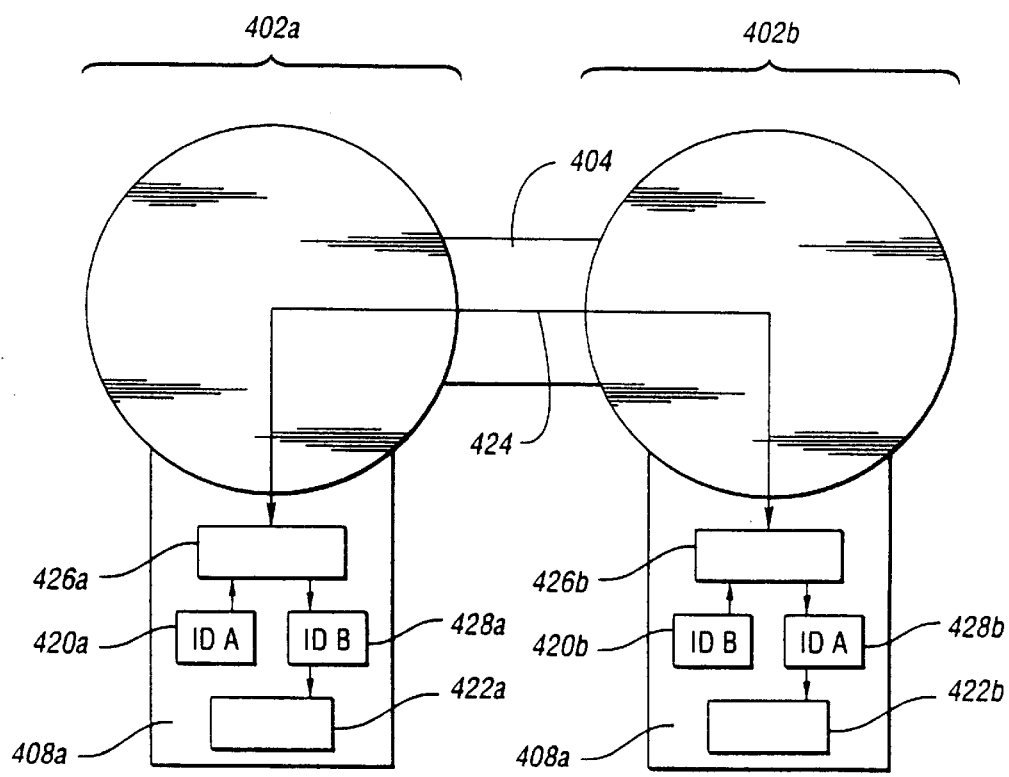
FIG. 4 is a schematic diagram showing the communication channel between the identifiers and identifier readers physically routed through a pass through port.

FIG. 4 shows the preferred embodiment of the present invention. Here, the communication channel 424 is a serial digital bus routed through the pass through port 404 that connects a pair of libraries, the left library 403a and the right library 402b. The communications channel 424 is linked to the LCUs 408a–b at each end. Communications channel 424 transfers the two identifiers 420a–b between both libraries of the pair of libraries 402a–b. In operation, identifier A 420a (ID A) for the left library 420a is copied into the communication channel 424 by way of a bus interface circuit 426a. Identifier A 420a is removed from the communication channel 424 inside the right LCU 408b by another bus interface circuit 426b, and then stored in memory 428b. In an identical fashion, identifier B 420b (ID B) associated with the right library 402b is copied into the communication channel 424 by the right bus interface circuit 426b. Identifier B 420b is then transferred through the pass through port 404, removed from the communication channel 424 by the left bus interface circuit 426a, and stored in memory 428a. The identifier readers 422a–b are coupled to the memories 428a–b respectively allowing them to read the identifier 420a–b of the opposite library 420a–b.

Use of a bus type of communication channel 424 in the preferred embodiment has additional advantages that will be discussed in more detail later. In particular, a general purpose bus linking the left library 402a with the right library 420b allows the two libraries 402a and 402b to communicate other information in addition to the respective identifiers 420a–b.

Figure 5:
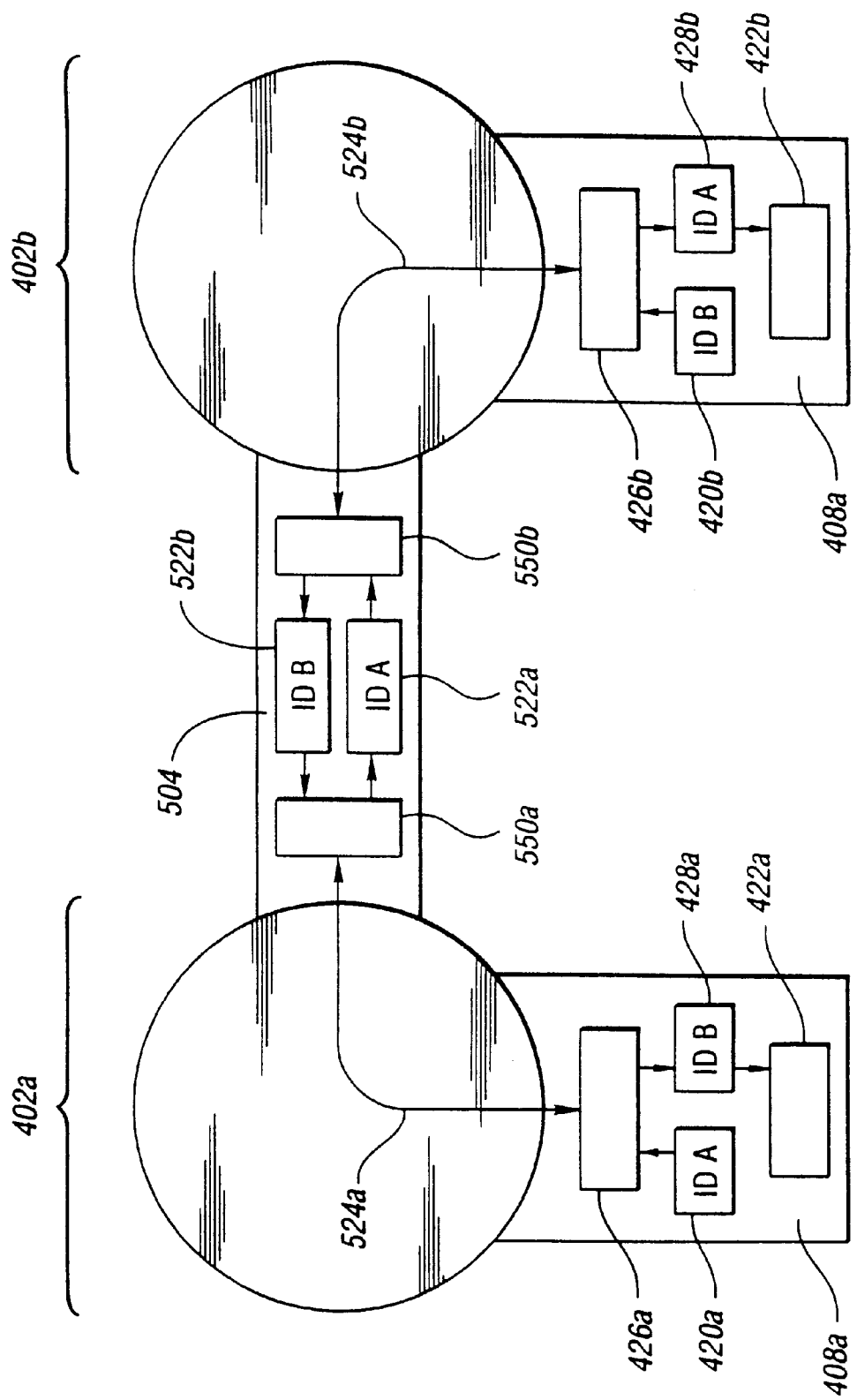
FIG. 5 is a schematic diagram showing the communications between the identifiers and identifier readers functionally routed through a pass through port.

FIG. 5 is a schematic diagram of another embodiment of the present invention. In this embodiment the pass through port 504 plays an active role in transferring the identifiers 420a–b between connected libraries 402a–. Identifier A 420a (ID A) is placed into a first communication channel 524a and transferred to the pass through port 504. At the pass through port 504, identifier A 420a is removed from the first communication channel 524a by another bus interface circuit 550a and buffered in memory 552a. From memory 552a, identifier A 402a is placed into a second communication channel 524b by another bus interface circuit 550b and transferred to the right library 402b. Once at the right library 402b, identifier A 402a is removed from the second communication channel 524b by bus interface circuit 426b where it is available to be read by the microprocessor 422b. Likewise, identifier B 420b(ID B) is transferred from the right library 402b, to the pass through port 504 in the second communication channel 524b. The pass through port 504 relays identifier B 402b from the second communication channel 524b, through a memory buffer 552b, then into the first communication channel 524a. From the first communication channel 524a, the identifier B 402b is stored in memory 428a where it is available to be read by microprocessor 422a.

Figure 6:
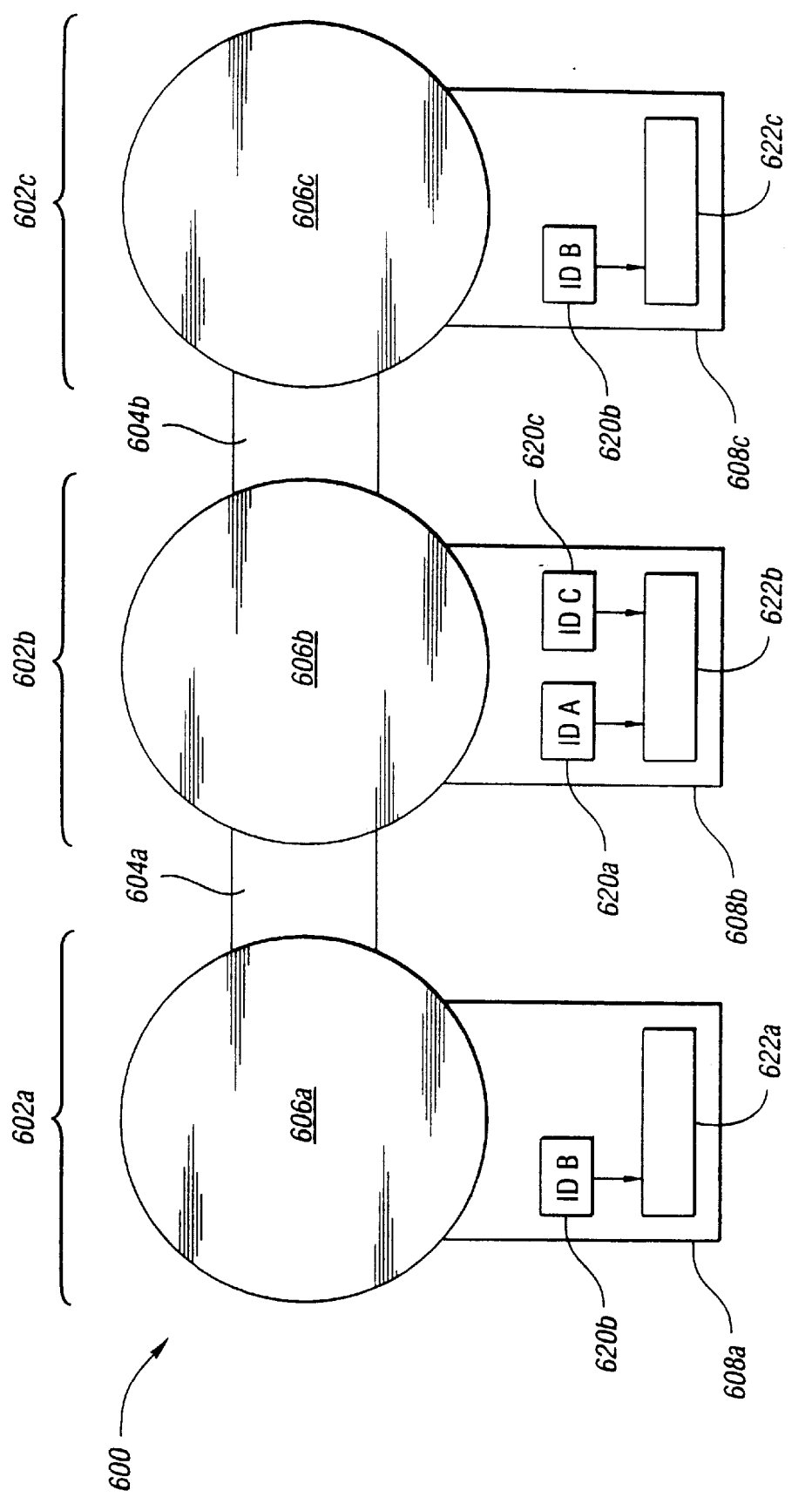
FIG. 6 is a schematic diagram where the identifiers are memory devices disposed in the adjoining libraries.

FIG. 6 shows a third embodiment of the present invention that does not require a communication channel running between libraries 602a–c. In this embodiment, the identifiers 620a–c are memory devices that are physically separate from their associated libraries 602a–c. As this robotic library system 600 is being assembled, the installer transfers the identifiers 620a–c into the LCUs 608a–c of the adjoining libraries 602a–c connected by pass through ports 604a–b.

Now the microprocessors 622a–c within each LCU 608a–c can directly read the identifiers 620a–c of the adjoining libraries 602a–c. As shown in FIG. 6, LSM A 606a is connected to LSM B 606b by pass through port 604a. LSM B 606b is connected to LSM A 606a and LSM C 606c. LSM C 606c is only connected with LSM B 606b by pass through port 604b. The identifier A 620a for the left library 602a is installed within LCU B 608b where it is readable by the LCU B's microprocessor 622b. Likewise, identifier C 620c associated with the right library 602c is installed within LCU B 608b where it is also readable by the microprocessor 622b. The center library 602b has two associated copies of its identifier B 620b, one is installed within LCU A 608a, the other installed within LCU C 608c. Note that since LSM A 606a and LSM C 606c are not directly connected by a pass through port, so they do not have copies of their respective identifiers 620a and 620c installed within each other's LCUs 608c and 607a respectively.

Figure 7:
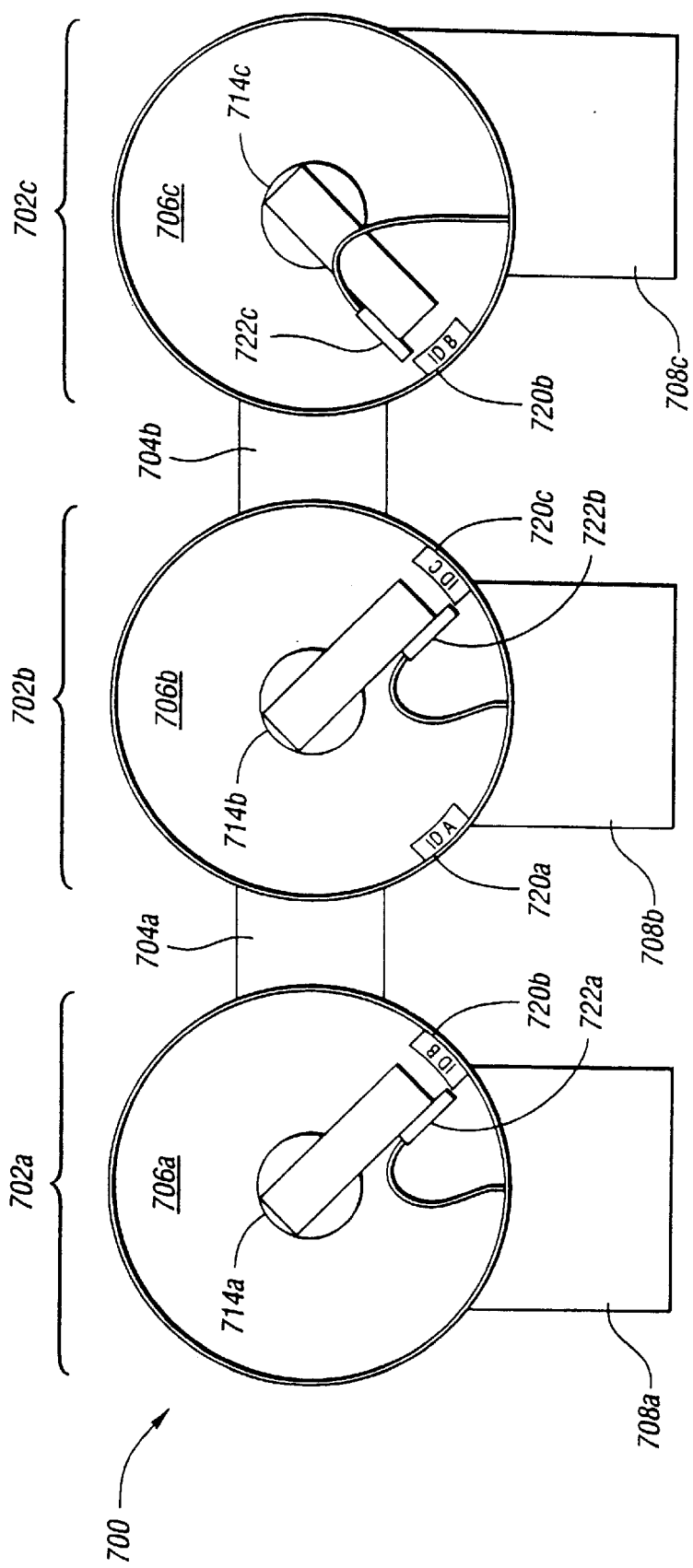
FIG. 7 is a schematic diagram where the identifiers are optical patterns and the identifier readers are optical cameras.

FIG. 7 shows an example where the identifiers 720a–c are made of an optical media. In particular, the identifiers 720a–c are bar codes similar to those used on the data cartridges. This approach allows the identifiers 720a–c to be read by the bar code (identifier) readers 722a–c mounted on the robotic mechanisms 714a–c. The bar code readers 722a–c read the identifiers 720a–c and then provided the information to LCUs 708a–c respectively. In this example, LSM A 706a is interconnected to LSM B 706b, LSM B 706b is interconnected with LSM A 706a and LSM C 706c, and LSM C 706c is interconnected only with LSM B 706b. During assembly of the robotic library system 700, the installer physically mounts the bar code identifier A 720a associated with the left library 702a within LSM B 706b where it is readable by bar code reader B 722b. Likewise, the bar code identifier C 720c associated with the right library 702c is also mounted within LSM 706b where it is readable by the bar code reader B 722b. Central library 702b has two associated bar code identifiers 720b. One of these bar code identifiers B 720b is physically mounted inside LSM A 706a where the bar code reader A 722a can read it. The other bar code identifier B 720b is physically mounted within LSM C 706c where the bar code reader C 722c can access it. For ease of installation, the bar code identifiers 720a–c may be mounted adjacent the corresponding pass through ports 704a–b.

Figure 8:
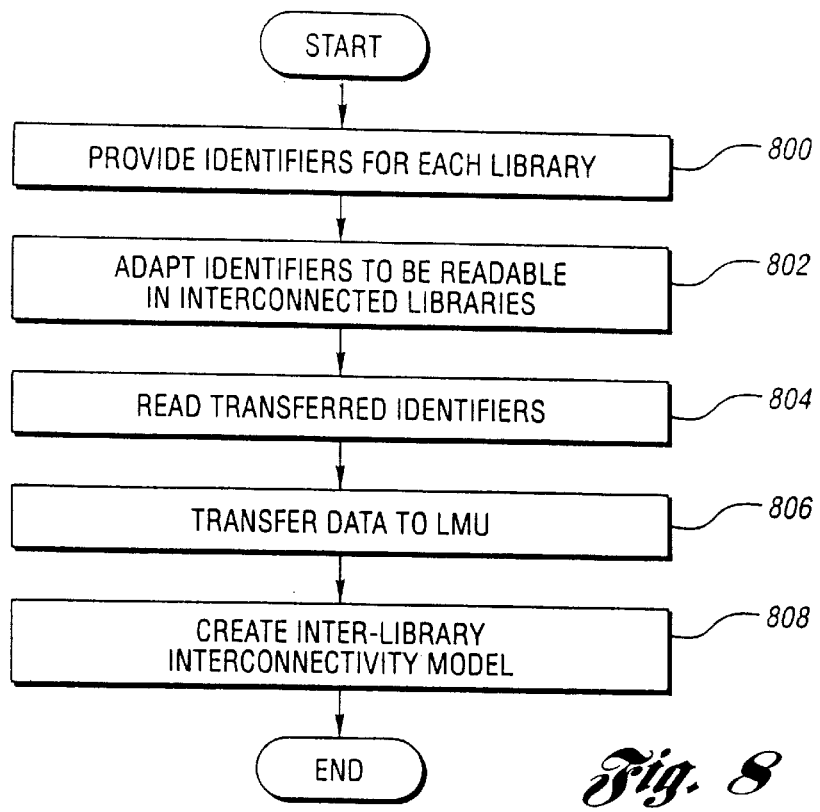
FIG. 8 is a flow diagram of a method for creating an inter-library connectivity model for the robotic library system.

FIG. 8 is a flow diagram of a method for creating a configuration model for the robotic library system. The method starts by providing a unique identifier for each library, as shown in block 800. The identifiers are then adapted to be readable by libraries connected together by a pass through port, as shown in block 802. Adaptation may be accomplished by transferring a logical copy of the identifiers between connected libraries using communication channels, see for example FIGS. 4 and 5. Adaptation may also be accomplished by physically placing, mounting or coupling the identifiers of one library within each adjoining connected library, see for example FIGS. 6 and 7. Identifier readers in the adjoining libraries read the identifiers and make that information available to the associated LCUs, as shown in block 804. Each LCU then transfers the information to the LMU, as shown in block 806. Once the LMU has the connectivity information from each LCU, it combines all this data to create an inter-library connectivity model, as shown in block 808. The LMU now knows the identity of each library within the robotic library system, and which pairs of libraries are connected by pass through ports.

Figure 9:
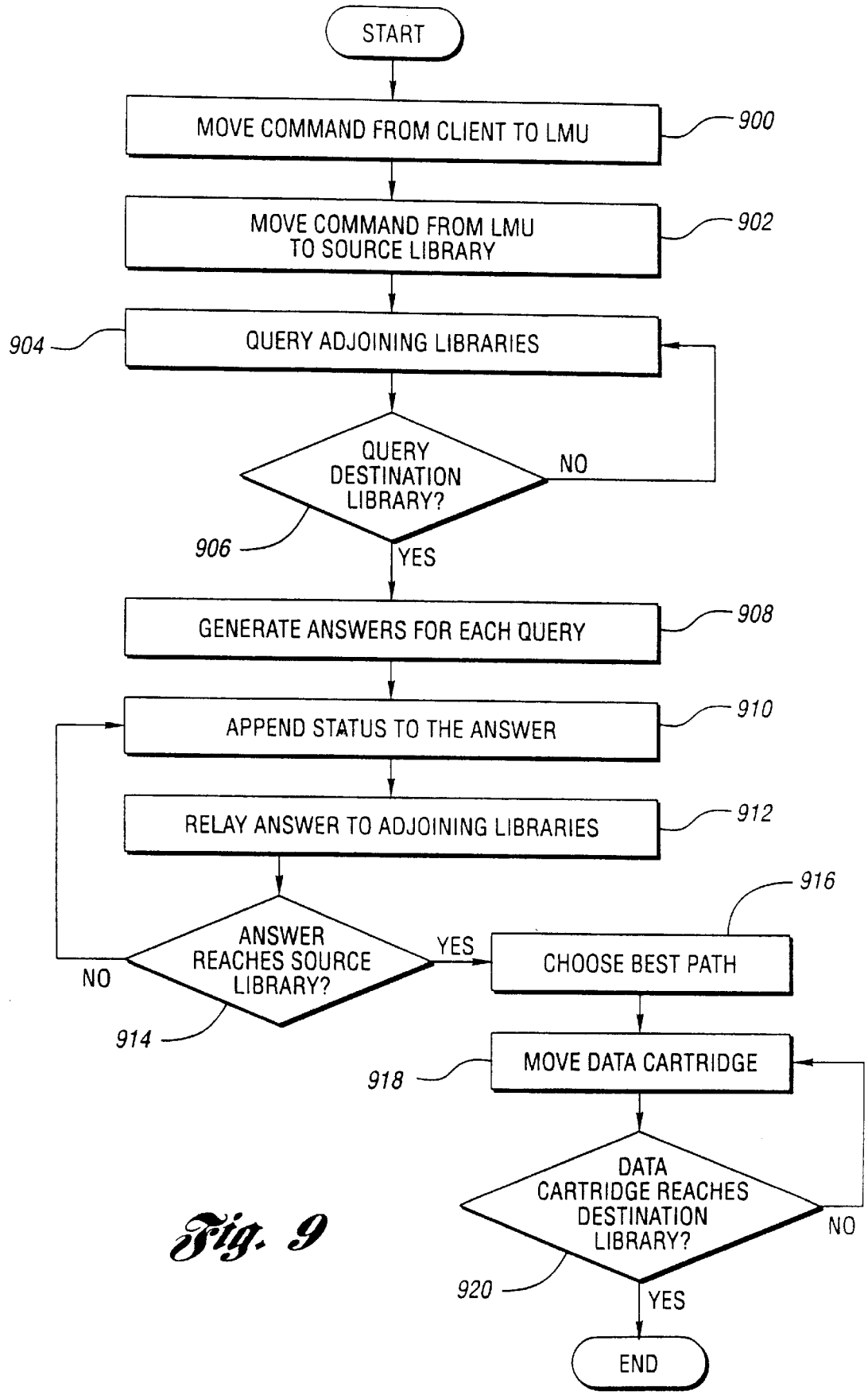
FIG. 9 is a flow diagram of a first method for moving a data cartridge from a source library to a destination library.

Knowledge of the inter-library connectivity allows the LCUs to handle data cartridge transfers between LSMs, a role traditionally reserved for the LMUs. FIG. 9 is a flow chart of a method for moving data cartridges from one library to another wherein inter-library transfers and routing are controlled by the LCUs. This operation begins when the LMU receives a command from the client to move a specific data cartridge from a source library to a destination library, as shown in block 900. The LMU then relays this command to the LCU of the source library holding the specific data cartridge, as shown in block 902. Next, the LCU in the source library queries all LCUs of adjoining libraries connected by a pass through port to see if one of them is the destination library, as shown in block 904. Each library receiving the query that is not the destination library will repeat the query to its adjoining libraries, the NO branch of decision block 906. This process is repeated until the destination library is queried, the YES branch of decision block 906.

The destination library responds to each query with an answer, as shown in block 908. This means that the destination library may generate multiple answers to multiple queries. Each library receiving an answer will append the status (e.g. busy, idle) of the pass through port through which the answer was received, as shown in block 910. The libraries then relay the appended answers to all other adjoining libraries connected by the pass through ports, as shown in block 912. This same process is then repeated by each library receiving an answer, the NO branch of decision block 914, until all answers are relayed back to the source library, the YES branch of decision block 914. The source library then examines all answers and the appended pass through port statuses to determine the best path through which the data cartridge should be transferred to the destination library, as shown in block 916.

Criteria for determining the best path to transfer a data cartridge may vary within the scope of the present invention. For example, the best path may be the path having the fewest number of pass through ports between the source library and the destination library, as determined by the identifiers along that path. In another example, the best path may be the path wherein all of the pass through ports are currently idle. Other criteria which may be considered includes whether or not the pass through port is currently operational, any anticipated activity in the near future, the quickness by which the path can be traveled, and the status of the robotic mechanisms along the paths under consideration.

Once the source library has determined the best path by which to move the data cartridge, it will transfer the data cartridge along with the chosen path to the next library on the path, as shown in block 918. The library receiving the data cartridge and path will transfer the data cartridge to the next library on the path, the NO branch of decision block 920 back to block 918. This process is continued until the data cartridge reaches the destination library, the YES branch of decision block 920. This ability of the LCUs to handle data cartridge transfers between LSMs make it possible to construct robotic library systems without the LMUs.

Figure 10:
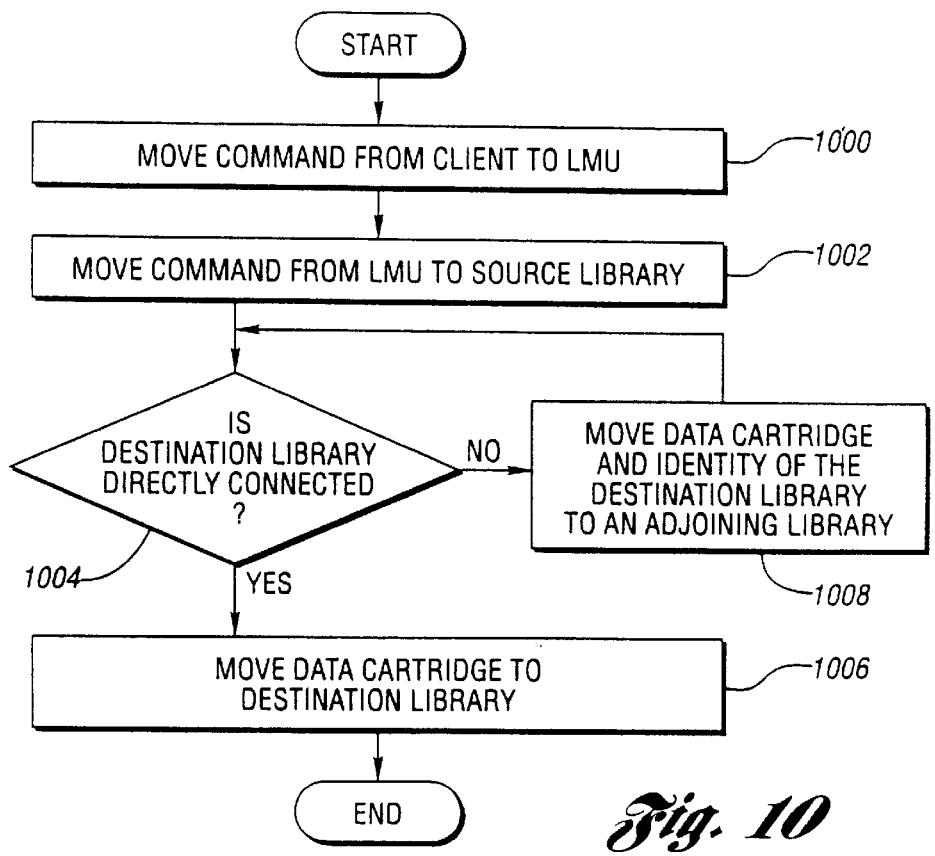
FIG. 10 is a flow diagram or a second method for moving a data cartridge from a source library to a destination library.

Self-discovery of inter-library connectivity allows for other methods of transferring data cartridges between the libraries. FIG. 10 is a flow diagram of a second method of transferring a data cartridge from the source library to the destination library. This method starts with the client sending the LMU a command to move the selected cartridge to the destination library, as shown in block 1000. The LMU responds by relaying this command to the source library currently holding the selected data cartridge, as shown in block 1002. The source library will then look at the identifiers read from its adjoining libraries, as shown by decision block 1004. If the destination library is directly connected to the source library through a pass through port, the YES branch of decision block 1004, then the source library will transfer the desired data cartridge directly to the destination library, as shown in block 1006. If the destination library is not connected directly to the source library, the NO branch of decision block 1004, then the source library will choose another library from among those that it is directly connected. The choice of the other library may be at random, chosen in accordance with some preset pattern, or by any other suitable method.

When the source and destination libraries are not directly connected, the source library transfers the desired data cartridge and the identifier of the destination library to the chosen library, as shown in block 1008. The chosen library then repeats the process just performed by the source library. In other words, it will check the identifiers of all adjoining libraries seeking the destination library. If the destination library resides at the other side of a pass through port, then the data cartridge will be sent to the destination library directly. Otherwise, the library will choose yet another adjacent library, pass the data cartridge and the identifier of the destination library.

Figure 11:
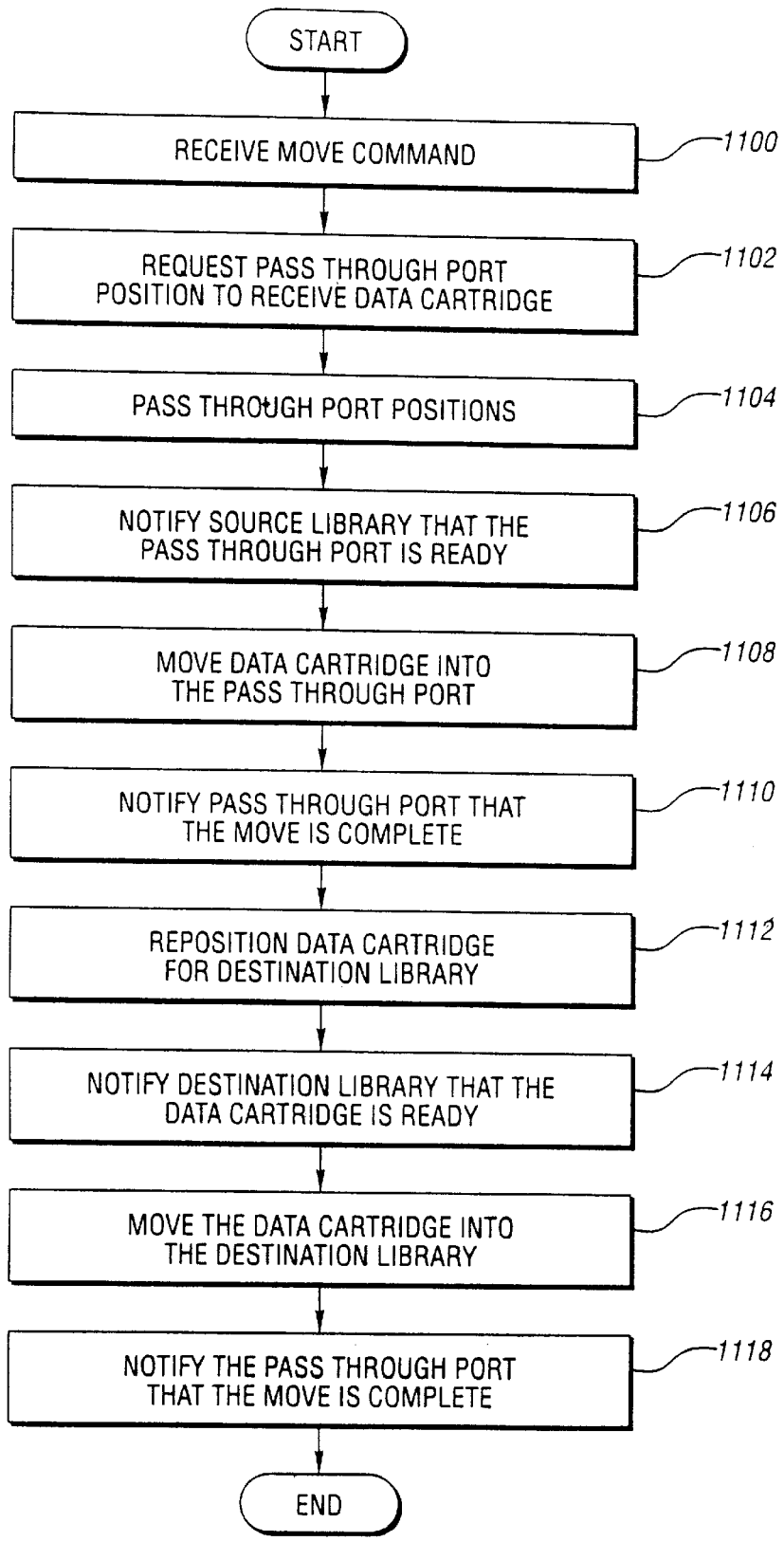
FIG. 11 is a flow diagram of a peer-to-peer method for moving a data cartridge between two connected libraries.

Referring momentarily back to FIG. 5, the presence of an intelligent pass through port along with an ability to communicate with the LCUs on either side of the pass through port, allow data cartridges to be transferred between libraries in a peer to peer fashion. Peer to peer type data cartridge transfers have an advantage over master/slave-type data cartridge transfers in that the source library is not dependent upon the destination library to initiate the data cartridge transfer. By contrast, in a master/slave relationship, the slave library cannot initiate a data cartridge transfer until the master library is ready to control the pass through port. FIG. 11 is a flow diagram of a peer to peer type method of transferring the data cartridge between libraries. The operation starts when the source library, currently holding the data cartridge, receives a command to move the data cartridge to the destination library, as shown in block 1100. Using the communication channel, the source library can request the pass through port to position itself to receive the data cartridge from the source library, as shown in block 1102. The pass through port eventually responds to this request by position itself to receive the data cartridge, as shown in block 1104.

Once the pass through port is ready to receive a data cartridge from the source library, it notifies the source library, as shown in block 1106. The source library then moves the data cartridge into the pass through port, as shown in block 1108. In block 1110, the source library notifies the pass through port when the transfer is complete.

Next, the pass through port repositions the data cartridge to be received by the destination library, as shown in block 1112. The pass through port notifies the destination library when the data cartridge is available, as shown in block 1114. Some time after receiving notification, the destination library removes the data cartridge from the pass through port, as shown in block 1116, and then notifies the pass through port that it has completed its operation, as shown in block 1118. One advantage of this method is that it involves little to no interaction from the LMU. Another advantage is that the source library can initiate and proceed with the transferring the data cartridge as far as the pass through port, even when the destination library is not ready.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A robotic library system containing a plurality of data cartridges, the robotic library system comprising:
    a plurality of libraries operative to store the plurality of data cartridges;
    a plurality of ports connecting the plurality of libraries, wherein each port of the plurality of ports is operative to move one at a time at least one data cartridge of the plurality of data cartridges between a respective pair of libraries of the plurality of libraries;
    a plurality of identifier readers, wherein one identifier reader of the plurality of identifier readers is coupled respectively to each library of the plurality of libraries; and
    a plurality of identifiers, wherein at least one identifier of the plurality of identifiers is associated respectively with each library of the plurality of libraries, and wherein each identifier is adapted to be read by the respective identifier reader coupled to the other library of the respective pair of libraries.

2. The robotic library system of claim 1 further comprising a plurality of communication channels linking the plurality of libraries, wherein each communication channel is operative to transfer both identifiers of the plurality of identifiers between both libraries of the respective pair of libraries to facilitate reading by the respective identifier readers.

3. The robotic library system of claim 2 wherein each communication channel of the plurality of communication channels is routed through a respective port of the plurality of ports.

4. The robotic library system of claim 1 wherein each port of the plurality of ports is in communications with both libraries of the respective pair of libraries.

5. The robotic library system of claim 1 wherein each identifier is an optical pattern.

6. The robotic library system of claim 1 wherein the each identifier is a memory device.

7. A robotic library system containing a plurality of data cartridges, the robotic library system comprising:
    a first library and a second library operative to store the plurality of data cartridges;
    a port connecting the first library to the second library, wherein the port is operative to move one at a time at least one data cartridge of the plurality of data cartridges between the first library and the second library;
    a first identifier reader and a second identifier reader coupled to the first library and the second library respectively; and
    a first identifier and a second identifier associated with the first library and the second library respectively, wherein the first identifier is adapted to be read by the second identifier reader, and the second identifier is adapted to be read by the first identifier reader.

8. The robotic library system of claim 7 further comprising a communication channel linking the first library to the second library, wherein the communication channel is operative to transfer the first identifier to the second library, and transfer the second identifier to the first library to facilitate reading by the second identifier reader and the first identifier reader respectively.

9. The robotic library system of claim 8 wherein the communication channel is routed through the port.

10. The robotic library system of claim 7 wherein the port is in communications with the first library and the second library.

11. The robotic library system of claim 7 wherein each identifier is an optical pattern.

12. The robotic library system of claim 7 wherein the each identifier is a memory device.

13. A method of operating a robotic library system having a plurality of libraries that store a plurality of data cartridges, one identifier reader disposed in each library of the plurality of libraries, and a plurality of ports connecting the plurality of libraries, wherein each port is operative to move one at a time at least one data cartridge of the plurality of data cartridges between a respective pair of libraries of the plurality of libraries, the method comprising:
    providing a plurality of identifiers, wherein at least one identifier of the plurality of identifiers is associated with each library of the plurality of libraries respectively to provide each library with a unique identity; and
    reading each identifier of the plurality of identifiers using the respective identifier reader coupled to the other library of the respective pair of libraries to identify which libraries of the plurality of libraries are interconnected.

14. The method of claim 13 further comprising combining each identifier read by each respective identifier reader to produce an inter-library connectivity model for the robotic library system, in response to reading each identifier.

15. The method of claim 13 further comprising transferring the plurality of identifiers through the respective plurality of ports prior to reading each identifier to facilitate reading by the respective identifier readers.

16. The method of claim 13 wherein both libraries of each pair of libraries are in communications with each other, the method further comprising:
    receiving a command at a source library of the plurality of libraries to move a first data cartridge of the plurality of data cartridges to a destination library of the plurality of libraries, after reading each identifier;
    querying each library in communication with the source library for each path to the destination library, in response to receiving the command to move the first data cartridge;
    repeatedly querying to other libraries in communications with each library receiving the query for each path to the destination library when the source library and the destination library are non connected directly to each other by a port;
    generating an answer for each query received, in response to the destination library being queried;
    repeatedly relaying each answer back to the source library when the source library and the destination library are non connected directly to each other by a port;
    selecting a path from the source library to the destination library, in response to the source library receiving the answers; and
    moving the first data cartridge from the source library to the destination library along the selected path.

17. The method of claim 16 wherein selecting a path includes identifying a shortest path through a fewest number of libraries of the plurality of libraries using the respective identifiers.

18. The method of claim 16 wherein selecting a path includes identifying a quickest path to the destination library.

19. The method of claim 16 wherein selecting a path includes identifying an idle path to the destination library.

20. The method of claim 13 further comprising:
   receiving a command at a source library of the plurality of libraries to move a first data cartridge of the plurality of data cartridges to a destination library of the plurality of libraries, after reading each identifier;
   determining from the respective identifiers if the destination library is directly connected to the source library by the plurality of ports, in response to being commanded to move the first data cartridge;
   moving the first data cartridge to the destination library in response to determining that the destination library is directly connected to the source library by the plurality of ports;
   moving the first data cartridge to another library of the plurality of libraries connected to the source library by the plurality of ports in response to determining that the destination library is not directly connected to the source library;
   repeatedly determining, by the other library receiving the first data cartridge, from the respective identifiers if the other library is directly connected to the destination library by the plurality of ports, in response to receiving the first data cartridge;
   moving the first data cartridge to the destination library in response to determining that the destination library is directly connected to the other library receiving the first data cartridge; and
   repeatedly moving the first data cartridge to yet another library of the plurality of libraries in response to determining that the destination library is not directly connected to the other library receiving the first data cartridge.

21. The method of claim 13 wherein the plurality of libraries includes a source library and a destination library directly connected to each other by a first port of the plurality of ports, method further comprising:
   receiving a command at the source library to move a first data cartridge of the plurality of data cartridges to the destination library, after reading each identifier;
   requesting the first port, by the source library, to position itself to receive the first data cartridge from the source library, in response to the source library receiving the command to move the first data cartridge;
   positioning the first port to receive the first data cartridge from the source library, in response to being requested to position itself to receive the first data cartridge from the source library;
   notifying the source library, by the first port, that the first port is positioned to receive the first data cartridge from the source library, in response to completing the positioning to receive the first data cartridge from the source library,
   moving the first data cartridge from the source library to the first port, in response the source library receiving notification that the first port is positioned;
   notifying the first port, by the source library, that the first data cartridge has been moved to the first port;
   repositioning the first data cartridge within the first port to move the first data cartridge to the destination library, in response to notification that the first data cartridge has been moved to the first port;
   notifying the destination library, by the first port, that the first data cartridge is available, in response to repositioning the first data cartridge; and
   moving the first data cartridge from the first port into the destination library, in response to notification that the first data cartridge is available.

* * * * *